United States Patent [19]

Sherman

[11] Patent Number: 4,516,296
[45] Date of Patent: May 14, 1985

[54] TUBING CLAMP AND METHOD OF MAKING THE SAME

[75] Inventor: Clarence A. Sherman, Birmingham, Mich.

[73] Assignee: ZSI, Inc., Redford, Mich.

[21] Appl. No.: 539,219

[22] Filed: Oct. 5, 1983

[51] Int. Cl.³ .................... B65D 63/06; F16L 3/08
[52] U.S. Cl. ........................................ 24/279; 24/285; 24/20 LS; 403/398; 403/313; 411/176; 411/378; 248/68.1; 248/74.1
[58] Field of Search ................. 24/279, 278, 277, 285, 24/20 LS, 22, 23 EE; 411/166, 176, 177, 180, 181, 183, 424, 378; 248/68 R–68 CB, 74.3, 72; 403/313, 398

[56] References Cited

U.S. PATENT DOCUMENTS

| 1,668,953 | 5/1928 | Erickson . | |
| 1,778,350 | 10/1930 | Bosco | 403/398 |
| 1,919,219 | 7/1933 | Church . | |
| 2,345,650 | 4/1944 | Attwood | 248/72 |
| 2,359,209 | 9/1944 | Ellinwood . | |
| 2,440,469 | 4/1948 | Goddard . | |
| 2,470,814 | 5/1949 | Hain . | |
| 2,535,427 | 12/1950 | Kindorf . | |
| 2,648,246 | 8/1953 | Mueller | 24/279 |
| 2,676,680 | 4/1954 | Kindorf . | |
| 2,697,570 | 12/1954 | Snyder | 24/279 |
| 2,866,372 | 12/1958 | Fisher . | |
| 2,897,569 | 8/1959 | Kastner | 24/279 |
| 2,918,239 | 12/1959 | Wirth . | |
| 2,961,210 | 11/1960 | Pfaff et al. . | |
| 2,983,897 | 5/1961 | Blanchet . | |
| 2,987,752 | 6/1961 | Black . | |
| 2,998,217 | 8/1961 | Englis et al. . | |
| 3,058,211 | 10/1962 | Axtell . | |
| 3,245,449 | 4/1966 | Mitchell | 411/176 |
| 3,291,426 | 12/1966 | Joyner et al. | 411/378 |
| 3,301,514 | 1/1967 | Sugaya . | |
| 3,346,286 | 10/1967 | Wescott | 411/424 |
| 3,362,449 | 1/1968 | Barwick et al. . | |
| 3,370,815 | 2/1968 | Opperthauser . | |
| 3,429,014 | 2/1969 | Roche | 24/279 |
| 3,431,960 | 3/1969 | Neuscholtz . | |
| 3,809,584 | 10/1957 | Smith | 24/279 |
| 3,924,317 | 12/1975 | Becker . | |
| 4,007,540 | 2/1977 | Tyree . | |
| 4,185,802 | 1/1980 | Myles et al. | 248/68 |

FOREIGN PATENT DOCUMENTS

| 425982 | 10/1947 | Italy | 24/279 |
| 757560 | 9/1956 | United Kingdom | 411/177 |

Primary Examiner—Victor N. Sakran
Attorney, Agent, or Firm—Cullen, Sloman, Cantor, Grauer, Scott & Rutherford

[57] ABSTRACT

A two-piece clamp for securing elongate cylindrical members, such as pipe, tubing, conduit or hose, to a channel. The two-piece clamp has two clamp halves fabricated with an aperture at one end. A stud is non-rotatably secured in the aperture of one of the clamp halves and is adapted to be detachably secured in the aperture of the other clamp half. A spacer may be integrally formed on the stud for permitting the clamp halves to be squarely clamped together. The method and machine for securing the stud to a clamp half features an automated assembly system for forming one end of the stud after assembling the clamp half thereon to securely lock the stud onto the clamp half.

4 Claims, 9 Drawing Figures

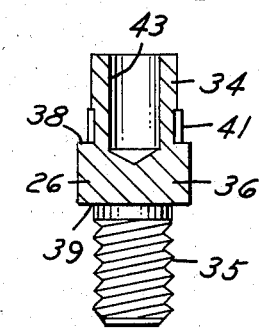
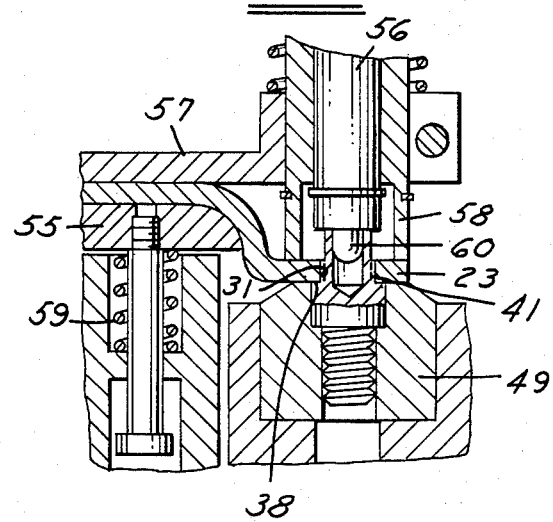
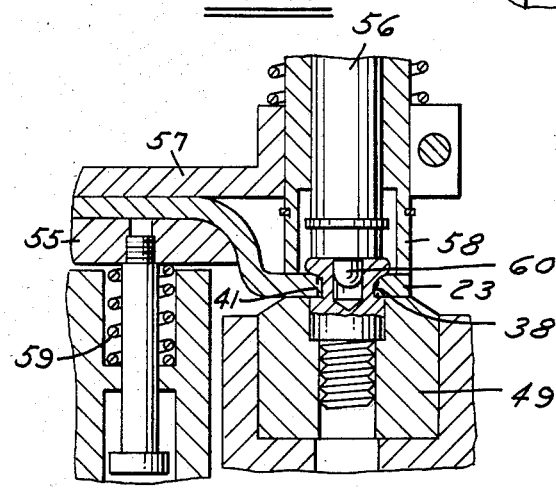
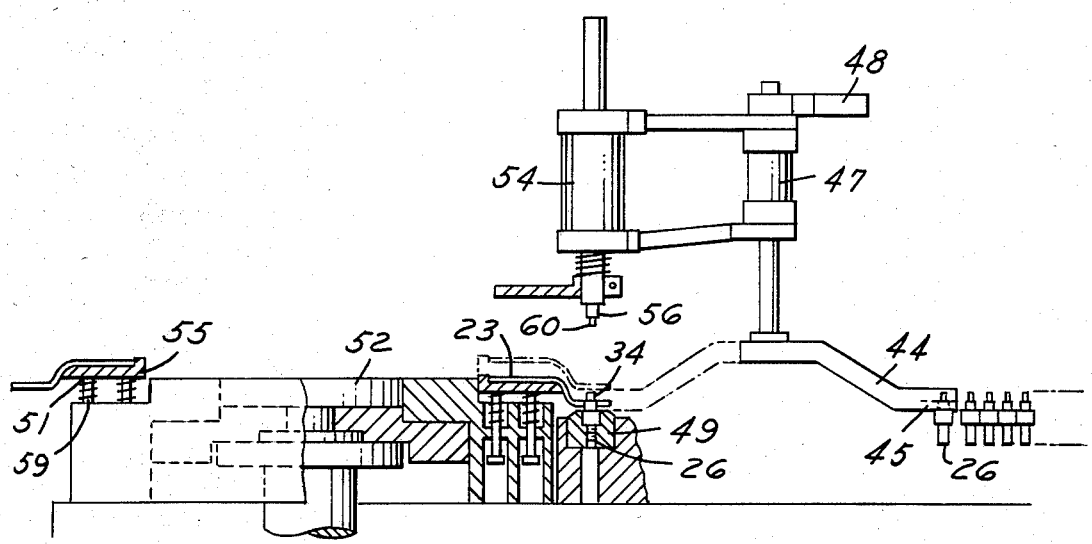

TUBING CLAMP AND METHOD OF MAKING THE SAME

BACKGROUND OF THE INVENTION

The present invention relates to a two-piece clamp for securing elongate cylindrical members, such as a pipe, conduit, tubing or hose, to a strut channel support member and a method and apparatus for making the improved clamp.

Pipe, conduit, tubing or hose clamps, hereinafter generally referred to as tubing clamps, are used to secure elongate sections of pipe, conduit, tubing or hose to a strut framing supporting structure by assembling the tubing clamps into a strut channel member which is secured to a wall or mechanical equipment. An example of a prior art two-piece clamp is shown in FIG. 1 and is generally indicated by reference numeral 10. The clamp assembly 10 is used to hold a tube, pipe or other cylindrical member 12 and is retained in a channel 14. First and second clamp halves 16 and 17 are secured together on one end by a bolt 19 and nut 20. The problem with prior art clamp assemblies is that the clamp assembly 10 may be excessively tightened to the point that the bolt 19 and the clamp halves 16 and 17 may be bent so as to not be reuseable. Likewise, overtightening of the clamp assembly 10 can collapse or otherwise damage the hose or tubing. Damage to the tubing used in refrigeration systems is a particular problem because thin wall tubing is normally a lightweight malleable material.

If the clamp halves or bolt are bent they must be repaired or replaced and are not economically reuseable.

Another problem with such prior art clamp assemblies is that the bolt and the two halves of the clamp assembly must be held together as the clamp is assembled by tightening the nut. This assembly procedure is sometimes difficult to perform particularly if the clamp is to be secured in an elevated location, in a location having limited accessibility or in an otherwise hard to reach location.

BRIEF SUMMARY OF THE INVENTION

The present invention relates to a clamp assembly having two clamp halves and a stud non-rotatably anchored on one of the clamp halves. The stud includes an integral or separable spacer portion which controls the clamping force exerted on the tubing and prevents deformation of the clamp halves or stud when the clamp assembly is tightened.

The stud of the present invention includes a serrated portion which prevents rotation of the stud within the clamp half. This bolt facilitates tightening of the clamp by permitting tightening to be performed with one tool since the stud is non-rotatably secured to the clamp half.

The present invention also relates to providing an automated assembly system for securing the stud to the clamp half. The clamp half to which the stud is secured is placed over the head of the stud and forced over the serrations on the head by means of a pressure pad. The head of the stud is then deformed outwardly embedding the serrations in the clamp half to securely anchor the stud on the clamp half.

Assembly of the stud to the clamp half may be accomplished with an automated system including an arm for placing the stud in an anvil member and a rotary index table for placing the clamp half in position on the stud. The stud and clamp half are secured together by a pressure cylinder which deforms the end of the stud as described above.

It is object of the invention to provide an easy-to-use clamp assembly that includes a spacer which prevents deformation of the tubing caused by overtightening the clamp and prevents bending of the clamp.

Another aspect of the invention is the simple and efficient automated assembly process for producing the unique tubing clamp assembly of the present invention.

These and other objects and advantages of the present invention will be better understood after studying the attached drawings in view of the following description.

BRIEF DESCRIPTION OF THE DRAWINGS

FIG. 6 is a partial cross-sectional view of the stud prior to assembly to a clamp half.

FIG. 7 is a partial cross-sectional view of the pressure pad and quill forcing the clamp over the serrated portion of the stud.

FIG. 8 is a fragmentary, cross-sectional view showing the mandrel deforming the stud to lock the stud to the clamp half.

FIG. 9 is a partial cross-sectional view of an assembly system for automatically assembling the stud to a clamp half.

DETAILED DESCRIPTION OF A PREFERRED EMBODIMENT

Figure 1:
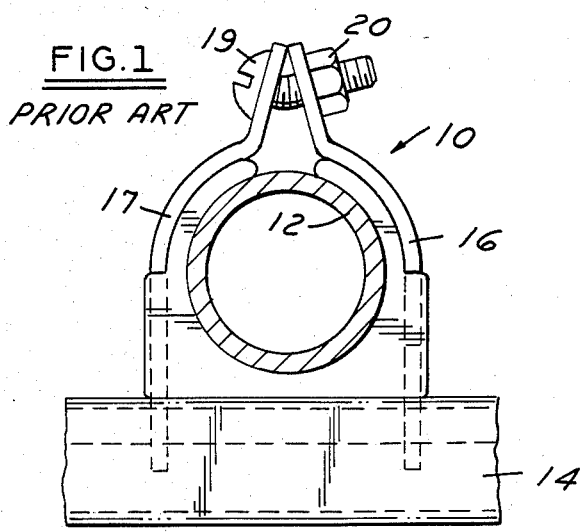
FIG. 1 is a side elevational view of a prior art two-piece clamp assembly secured to a channel and retaining a tubing.

Referring now to FIGS. 2, 3, 4 and 5, the improved clamp assembly 21 of the present invention is generally indicated by reference numeral 21. The improved clamp assembly 21 comprises first and second clamp halves 23 and 24 which are detachably secured together by means of a stud 26 and an internally threaded nut 27. A cushion insert 29 may be provided if desired inside the first and second clamp halves 23 and 24 for indirectly engaging the tubing, or other cylindrical member through the elastomeric cushion which partially encircles the tube 12 and is retained within the clamp assembly 21. The unique squeeze control clamp may also be used directly against the tube 12 if it is not desireable to use the cushion insert 29.

First and second clamp halves 23 and 24 each include an aperture 31 on one end for receiving the stud 26. Channel interlocking feet 32 are provided on the opposite end of each of the first and second clamp halves 23 and 24 for engaging the channel 14.

Figure 2:
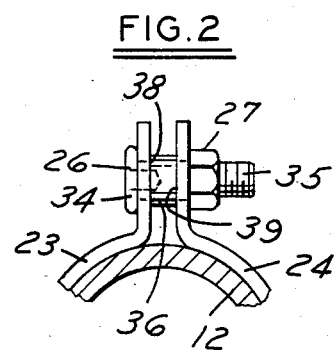
FIG. 2 is a fragmentary, elevational view showing two clamp halves squarely secured together by the stud to directly clamp an elongate cylindrical member such as a pipe.
Figure 3:
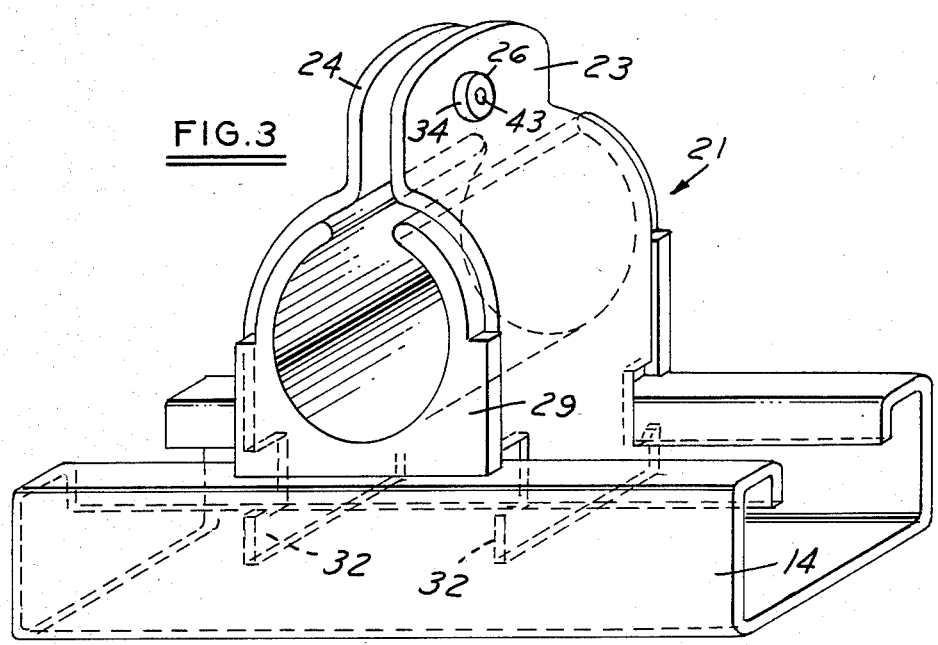
FIG. 3 is a perspective view of a tubing clamp including an elastomeric cushion secured to a channel.
Figure 4:
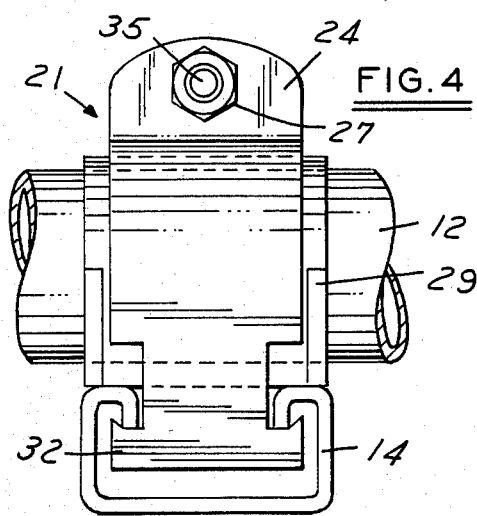
FIG. 4 is an end elevational view showing a fragmentary portion of tubing retained within a tubing clamp assembly.
Figure 5:
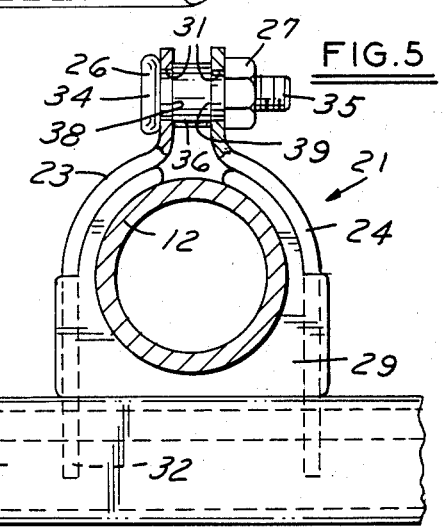
FIG. 5 is a side elevational view showing the tubing clamp assembly.

Referring now to FIGS. 2, 5, and 6, the stud 26 is shown to include a head 34 on one end and an externally threaded end 35 on the opposite end for receiving the nut 27. A spacer portion 36 is provided between the head 34 and the externally threaded end 35. The spacer portion 36 may be an integrally formed part of the stud 26, as shown in the drawing or may be a separate member. The spacer portion 36 is provided to control the extent to which the first and second clamp halves 23 and 24 may be tightened. The spacer portion 36 includes first and second shoulders 38 and 39 which are parallel to each other and perpendicular to the axis of the stud 26. The first and second shoulder 38 and 39 assure that the first and second clamp halves 23 and 24 are tightened squarely to one another which eliminates the problem of deformation in prior art clamp assemblies caused by overtightening. In this way the clamp assembly provides a unique squeeze control feature that prevents deformation of the tubing which is likewised caused by overtightening prior art clamp assemblies.

The stud 26 includes a serrated section 41 immediately adjacent the first shoulder 38. A pilot hole 43 is provided in the head 34 of the stud 26 to facilitate assembling the stud 26 to the first clamp half 23, as will be described in detail subsequently.

Referring now to FIGS. 7, 8 and 9, the method and apparatus for assembling the stud 26 to the first clamp half 23 will be described in detail. The stud 26 is picked up by an arm 44 having a caliper gripping mechanism 45. The arm 44 is lifted by a cylinder 47 and rotated by an oscillating mechanism 48 which moves the arm 44 over the anvil 49. The cylinder 47 then lowers the stud 26 into the anvil 49. The arm 44 is then moved clear of the anvil 49 and returns to pick up another stud 26. The first clamp half 23 is then placed into a load/unload station 51 on a rotary index table 52 for assembly on to the stud 26 in the anvil 49. The index table 52 is rotated 180° in the disclosed embodiment to place the first clamp half 23 over the head 34 of the stud 26.

After the stud 26 and first clamp half 23 are loosely assembled together, a power cylinder 54 is actuated to drive the mandrel 56 toward the anvil 49 to assemble the first clamp half 23 and stud 26 together. As the mandrel 56 is driven toward the anvil 49 a pressure pad 57 and quill 58 are driven against the first clamp half 23 to force the aperture 31 over the head 34 and on to the serrated section 41. The pressure pad 57 and quill 58 are spring loaded relative to the mandrel 56 to permit the mandrel 56 to move relative thereto.

After the first clamp half 23 is seated on the serrated section 41 in contact with the first shoulder 38, the mandrel 56 continues its downward motion, to the position shown in FIG. 7, until the pilot end 60 enters the pilot hole 43 in the head 34 of the stud 26. The mandrel 56 continues downwardly, as shown in FIG. 8, to deform, or upset, the head 34 of the stud 26 outwardly to force the serrated section 41 to grip the sides of the aperture 31 and lock the deformed portions of the head 34 into engagement with the first clamp half 23. In this way, the stud 26 is securely locked to the first clamp half 23 to prevent relative rotation between the respective parts.

The mandrel 56 is then retracted to permit the rotary index table 52 to move the finished part out of the forming station and begin the cycle once again. The finished part is then ejected by a lifter 55 from the load/unload station 51, as is well known in the art. Springs 57 are provided to return the lifter 55 to its initial position ready for another part to be placed in the load/unload station 51.

The first clamp half 23 is accurately and squarely assembled on the stud 26 by the coaction of the quill end 58 and pressure pad 57 since they act to drive the first clamp half 23 securely into engagement with the serrated section 41 and against the first shoulder 38. Since the first and second shoulders 38 and 39 are parallel to one another when the first and second clamp halves 23 and 24 are assembled together to form the improved clamp assembly 21 they provided a seating surface for tightening the clamp halves squarely together.

The assembly system may be used with clamp halves made of different types of materials and there is no need to select a stud and clamp half that are compatible as would be required if the two parts were welded together. Also, if the stud were welded to the clamp half, the stud could be misaligned during welding resulting in the first and second clamp halves 23 and 24 not being square to each other when assembled together with the stud to form the clamp assembly.

A preferred embodiment of the invention has been described in detail so as to enable one skilled in the art to make and use the invention. It is to be understood that this detailed description should be interpreted by way of example only and that the scope of the patent is to be limited only by reference to the following claims.

What is claimed is:

1. A clamp for securing a cylindrical member comprising a first clamp half and a second clamp half having inner and outer sides for encircling the cylindrical member, the first clamp half and second clamp half having means at their ends for interlocking with a channel member and having apertures of a substantially equal diameter formed at their opposite end for receiving a stud, said stud comprising an elongated member having a longitudinal axis, a head portion at one end abuttingly engaging the outer side of the first clamp half and externally threaded portion at the opposite end for receiving an internally threaded nut abuttingly engaging the outer side of the second clamp half to tighten the first clamp half and second clamp half about the cylindrical member, and an elongated spacer coaxial with the longitudinal axis of said elongated member and integral with said elongated member interposed between said head portion and said externally threaded portion, said spacer having a diameter greater than the diameter of said apertures forming first and second spaced apart parallel shoulders perpendicular to the longitudinal axis of said elongated member, the inner side of the first clamp half being squarely abutted against the first shoulder and inner side if the second clamp half being squarely abutted against the second shoulder when said internally threaded nut is tightened against the outer side of the second clamp half, said first and second shoulders preventing the first clamp and second clamp half from being tightened to the extent that they damage the conduit or bend the side, said head portion being pressed against the outer side of said first clamp half tightly restricting the first clamp half between said head portion and said first shoulder, said stud being restrained from turning within the aperture in said first clamp half, wherein said head portion further comprises a serrated section adjacent said first shoulder receivable by said aperture in said first clamp half, said serrated section preventing said stud from turning within said aperture.

2. In the clamp of claim 1, further comprising a cushion having inner surface for engagement with the cylindrical member and an outer surface adapted to be engaged by the first and second clamp members.

3. In the clamp of claim 1 wherein the spacer is sized to limit the tightening pressure exerted on the cylindrical member.

4. A clamp as claimed in claim 1, wherein said head portion includes a pilot hole for receiving a mandrel, said head portion being deformed by the action of the mandrel pressing the head portion against the outer side of said first clamp half.

* * * * *